H. W. DOVER.
HAND WHEEL.
APPLICATION FILED SEPT. 30, 1920.
1,398,069.
Patented Nov. 22, 1921
2 SHEETS—SHEET 1.
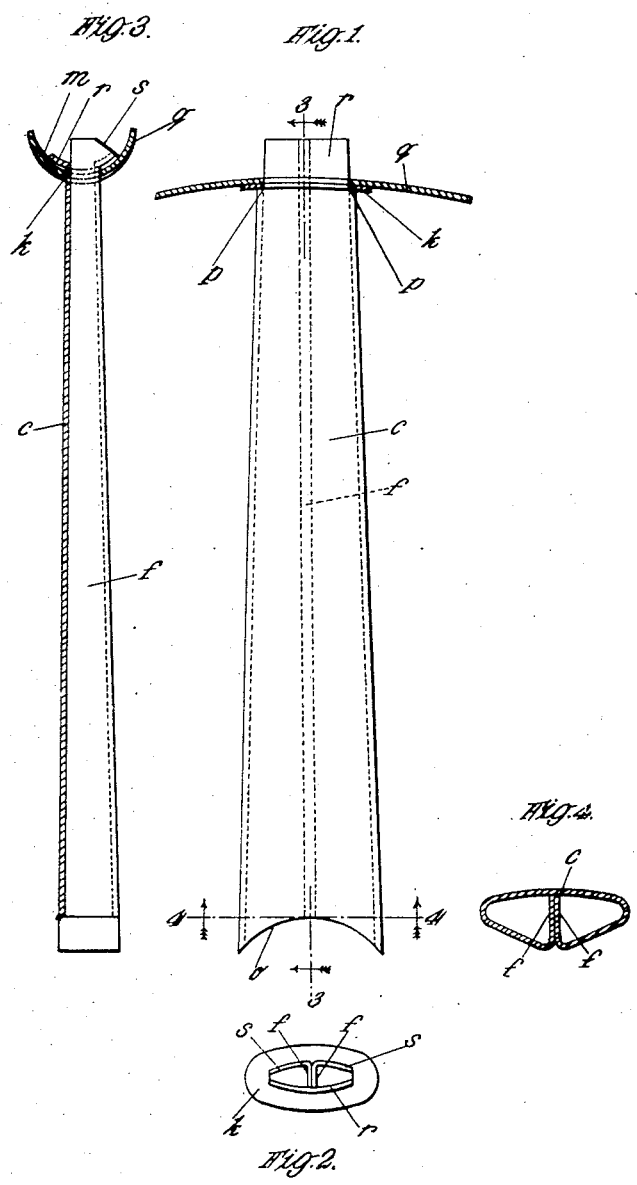

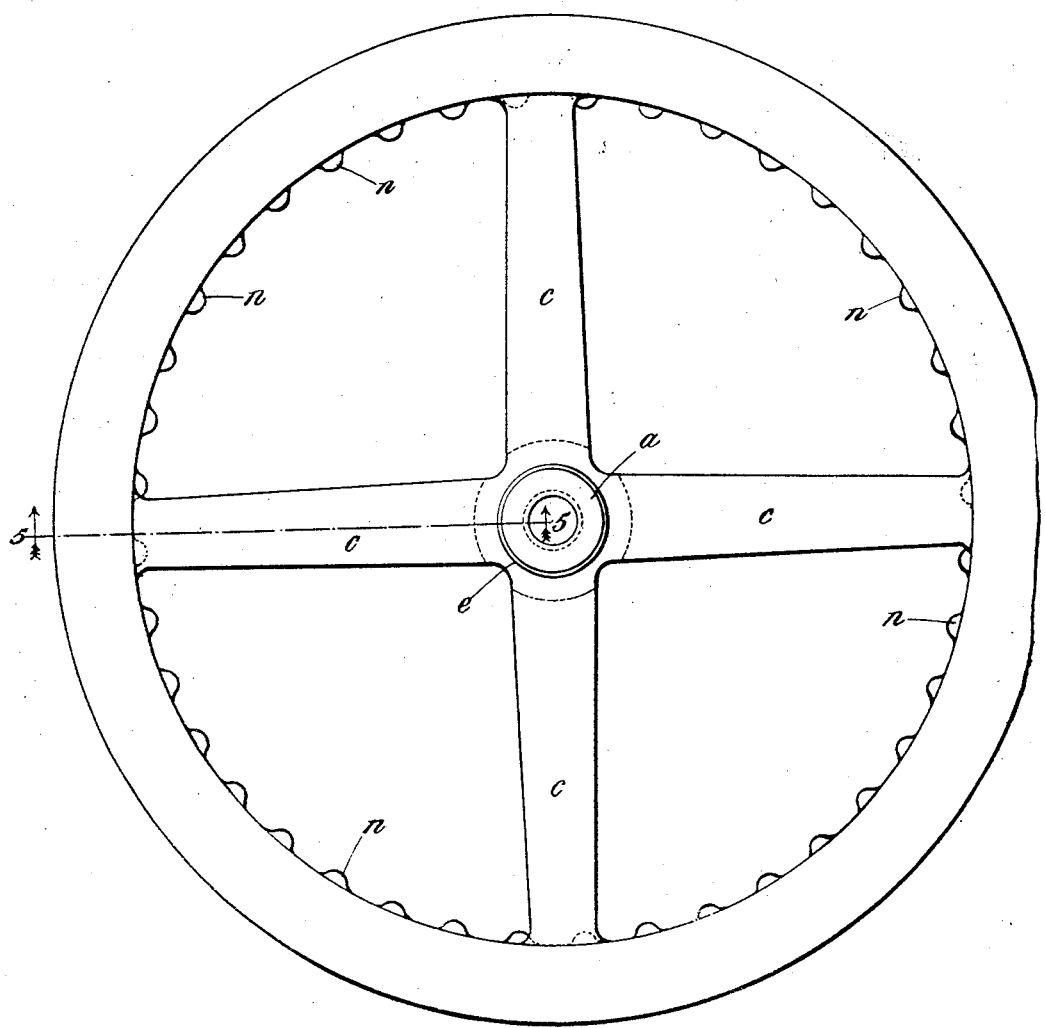

UNITED STATES PATENT OFFICE.

HORACE WALTER DOVER, OF ST. JAMES, ENGLAND.

HAND-WHEEL.

1,398,069.　　　　Specification of Letters Patent.　　Patented Nov. 22, 1921.

Application filed September 30, 1920. Serial No. 413,851.

*To all whom it may concern:*

Be it known that I, HORACE WALTER DOVER, a British subject, of Holywood, St. James, Northampton, England, have invented certain new and useful Improvements in or Relating to Hand-Wheels, of which the following is a specification.

This invention relates to hand wheels such for instance as are employed for steering motor vehicles, for operating stop cocks, controlling aircraft, motor boats, gun mechanism, and for other purposes, and has for its object to provide an improved form of arm or spoke for such hand wheels.

According to the invention set forth in the specification accompanying my application for Letters Patent Serial No. 413,850 the hub of such a hand wheel is formed peripherally with a groove adapted to receive the inner ends of the arms of spokes of the wheel, said groove being bounded on two of its sides by flanges adapted to be pressed toward one another so as to fit closely around said arms, and according to the invention set forth in the specification accompanying my application for Letters Patent Serial No. 413,852 the nave of such a hand wheel is formed from a distance piece or distance pieces, two stamped metal plates and means for securing said plates the one above and the other below said distance piece or distance pieces, said plates being so stamped that when the parts are assembled sockets are provided adapted to receive the inner ends of the arms or spokes of the wheel. The arms constituting the subject of the present invention are especially adapted for use in a wheel according to either of my said inventions and are formed from sheet metal bent each from a blank to the desired cross-section of arm required, the lateral marginal portions of the blank being inturned at what is to be preferably, the underside of the arm, so as to form a diaphragm across, or strengthening rib within, the arm.

The accompanying drawings illustrate the invention Figure 1 being a face view of an improved arm, showing a washer and a portion of a rim in section and showing the end of the arm inserted therethrough but not bent over, Fig. 2 an end view thereof omitting the rim-portion, Fig. 3 a longitudinal section on the line 3—3, Fig. 1, showing the end of the arm bent over, Fig. 4 a cross section on the line 4—4, Fig. 1, while Fig. 5 is a sectional side view of a wheel on a smaller scale embodying the improved arm and Fig. 6 is a plan thereof, those parts of Fig. 5 which are to the right of the center line being shown in elevation and those parts to the left of said line being shown in section on the line 5—5 Fig. 6.

As shown in Figs. 5 and 6 a hand wheel is built up from a grooved hub $a$ made according to the invention set forth in the specification accompanying my application for Letters Patent Serial No. 413,850. Arms $c$ . . . are made according to the present invention and a rim-portion constructed according to the invention set forth in the specification accompanying my application for Letters Patent Serial No. 413,854.

As shown in Figs. 1 to 4 and in accordance with one form of the present invention the arm $c$ is of substantially flattened oval cross-section the underside being V-shaped and the lateral marginal portions $f$ $f$ of the blank from which the arm $c$ is bent up are sharply inturned so as to lie contiguous with one another and constitute a diaphragm or strengthening rib lying substantially along the minor axis of the cross-section as shown in Fig. 4. Such an arm may be very readily formed and is extremely rigid.

When intended for use with a wheel hub constructed according to either of my above mentioned inventions the inner end of the arm $c$ may be shaped as at $o$, $e$, $g$, to conform with the circumstances at the bottom of the groove in the hub portion $a$ and at its outer end it may be machined away at each side so as to form shoulders, as at $p$, $p$, the central remaining part being passed first through a suitably apertured washer $k$ then through a corresponding aperture in one of the channeled members $q$, from two of which, and a stiffening band, (not shown) the rim-portion of the wheel may be built up in accordance with my prior British Letters Patent No. 2623 of 1906 and then through another suitably apertured washer $m$ disposed within the channeled member $q$, after which the upper portion of the arm, which constitutes a tongue $r$ is bent away from the lower portion $s$ so as to lie flat against the washer $m$ and the lower portion $s$ is bent as much as possible to lie flat against said washer $m$. The end of the arm $c$ and the washer $m$ may then be brazed, welded, or otherwise united together and to the channeled member $q$. The remainder of the rim-portion is then built up in accordance with the above-mentioned British Letters Patent 2623 of 1906 or, as shown in Fig. 5 the rim-portion may be built up, in accordance with the invention set forth in the specification accompanying my application for Letters Patent Serial No. 413,854 of an annular outer peripheral portion $g$ of concavo-convex cross-section and an annular inner peripheral portion constituted by two parts $h$, $j$, each of concavo-convex cross-section, the whole with the exception of the end faces of the hub-portion $a$ and its axial bore being incased in a casing $e$ of celluloid, exonite, or similar material, or of a non-inflammable material capable of being molded in a similar manner, applied according to any of the well-known methods of manufacture (e. g. molding).

If desired the rim-portion and the arms may be wrapped spirally with a tape of linen or other fabric after which the covering compound or material may be applied as above mentioned.

The inner peripheral portion of the rim-portion of the wheel may be formed with a plurality of ribs $n$ . . . to facilitate the gripping of the wheel by the user.

Having now particularly described and ascertained the nature of my said invention and in what manner the same is to be performed, I declare that what I claim is:—

1. An arm for a hand wheel bent from a sheet metal blank, the marginal portions of said blank being inturned and forming a diaphragm within the arm, substantially as set forth.

2. An arm for a hand wheel bent from a sheet metal blank, the marginal portions of said blank being inturned at the underside of said arm and forming a diaphragm within said arm, substantially as set forth.

3. An arm for a hand wheel, said arm being of substantially flattened oval cross-section with its underside V-shaped and being bent from a sheet metal blank, the marginal portions of said blank being sharply inturned at said underside so as to lie contiguous with one another and forming a diaphragm lying substantially along the minor axis of the cross-section of said arm, substantially as set forth.

4. An arm for a hand wheel bent from a sheet metal blank, the marginal portions of said blank being inturned and forming a diaphragm within the arm, one end of said arm being shaped to a concave curve and the other end of said arm being formed with shoulders, substantially as set forth.

5. An arm for a hand wheel, said arm being of substantially flattened oval cross-section with its underside V-shaped and being bent from a sheet metal blank, the marginal portions of said blank being sharply inturned at said underside so as to lie contiguous with one another and forming a diaphragm lying substantially along the minor axis of the cross-section of said arm, one end of said arm being shaped to a concave curve and the other end of said arm being formed with shoulders, substantially as set forth.

HORACE WALTER DOVER.